SYNCHRONIZATION TIMING DIAGRAM
FOR IN SYNC CONDITION

SYNCHRONIZATION TIMING DIAGRAM
FOR OUT OF SYNC CONDITION
(INTERROGATION PULSE LATER BY $\Delta t$)

SYNCHRONIZATION TIMING DIAGRAM
FOR OUT OF SYNC CONDITION
(INTERROGATION PULSE EARLY B Δt)

INVENTOR.
WALTON GRAHAM
BY Darby & Darby
ATTORNEYS

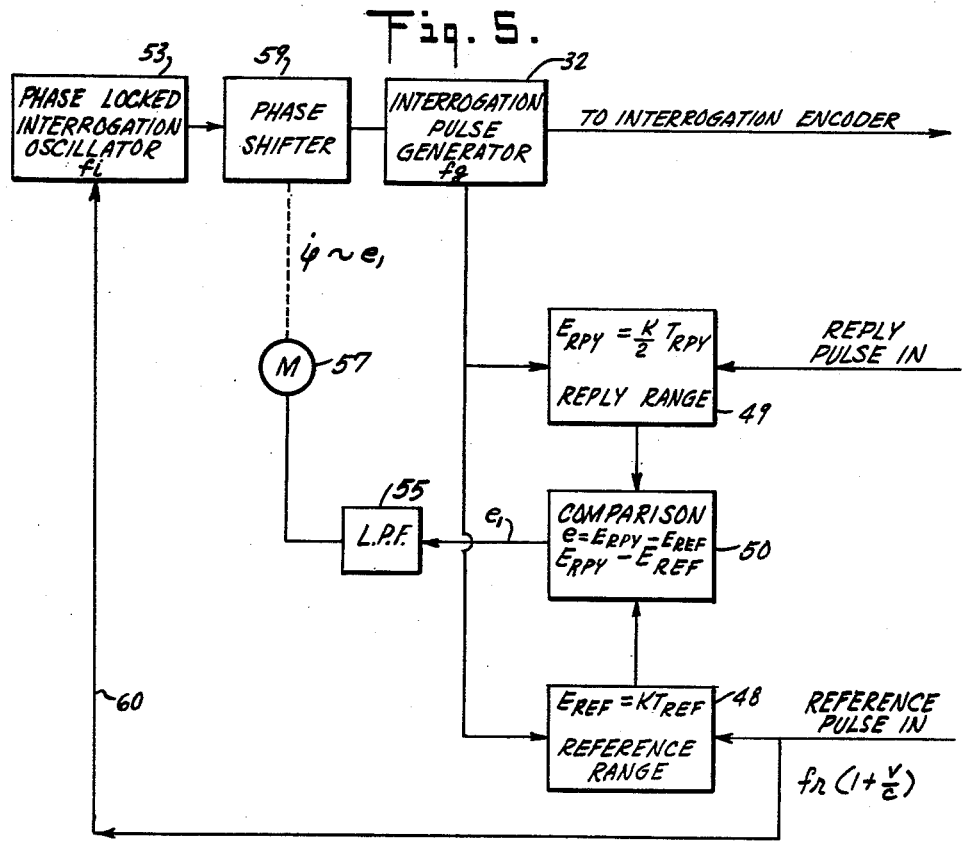

:::
United States Patent Office 3,183,504
Patented May 11, 1965

3,183,504
COMPATIBLE AIRBORNE NAVIGATION-AIR TRAFFIC CONTROL AND COLLISION AVOIDANCE SYSTEM
Walton Graham, Roslyn, N.Y., assignor, by mesne assignments, to Control Data Corporation, South Minneapolis, Minn., a corporation of Minnesota
Filed June 13, 1960, Ser. No. 35,659
30 Claims. (Cl. 343—7.5)

This invention relates to aircraft radio navigation systems and more particularly to a method and system for supplementing existing radio navigation systems to provide each aircraft or vehicle with information as to its distance from other aircraft or vehicles, such information being suitable for pilot warning, collision avoidance, and air traffic control purposes, in addition to the basic navigation function.

As the number of aircraft operating in the air space increases, it becomes more and more necessary to provide a system to prevent aircraft collisions. The collision problem also becomes greater as the speeds of aircraft increase since it takes longer for an aircraft to institute and complete an evasive maneuver to avoid a collision once visual or radio contact with a possible colliding craft is made. In many cases, where visual contact alone is relied upon, the speeds of the aircraft are so great that there is not enough time to make an evasive maneuver to avoid collision.

In certain types of aircraft radio navigation systems, the aircraft carries a navigation transmitter and receiver. By cooperative signalling with a ground base station, the bearing of the aircraft and the range of the aircraft from the ground station can be determined. One such radio navigation system currently in use is the Tacan system. In the Tacan system, each aircraft determines its range from a ground station (beacon) by measuring the elapsed time between the transmission of an interrogating pulse and the reception of a reply pulse, which is transmitted by the beacon in response to the aircraft's interrogation pulse. Bearing is determined by comparison of the phase of a low frequency amplitude modulated signal produced by modulation of a rotating antenna radiation pattern with the phase of the reference signal transmitted by the beacon. The principles of the Tacan system are described in an article entitled "Principles of Tacan" appearing in the March 1956 edition of "Electrical Communication." This navigation system is also described elsewhere and it is therefore not necessary to further describe its operating principles. The present invention is particularly applicable to, but is not limited to, the Tacan system.

As pointed out in the aforementioned article, the interrogation pulses transmitted by different aircraft are not synchronized, and the reception by one aircraft of pulses transmitted by other aircraft cannot be exploited directly to yield the range between aircraft. In fact, reception of other aircraft's interrogation pulses is usually avoided in order not to create any interference or confusion between each aircraft's transmission and reception of its own pulses.

According to one aspect of the present invention, by synchronizing all aircraft radio navigation transmitters with the beacon transmitter and by receiving pulses from other aircraft, each aircraft can measure the range to all of the other aircraft from which it receives pulses. This can be done merely by measuring the elapsed time between the transmission of the measuring aircraft's transmitted interrogation pulse and the reception of the interrogation pulse from another aircraft. Since, due to synchronization, both pulses are transmitted at the same time, the measurement of the elapsed time gives the range. Such a range measurement between aircraft is particularly advantageous since it enables a pilot to ascertain whether there is another aircraft close enough to collide with him and gives him sufficient time to evade it.

The bearing of one aircraft with respect to another can also be determined by making measurements of the received pulses, for example, by the use of such well known techniques as interferometric radio measurements. By providing each aircraft with the range and bearing of all other aircraft within the apparent danger sector a pilot warning indicator and collision avoidance system can be realized.

By using similar techniques at the beacon station, or any other ground station synchronized with the beacon, an air traffic control system can be realized to the extent of providing the ground station with the range, bearing, and altitude of every aircraft within the line of sight of the ground station which is also synchronized to the beacon.

One way of maintaining the required transmitter synchronization is to provide every aircraft and every beacon with highly accurate frequency standards such as an atomic frequency standard. Such a system was proposed in a paper entitled "Atomichrons in Collision Avoidance and Air Traffic Control Systems" which was presented to the Air Transportation Association meeting in August 1958, at Washington, D.C. However, even the best atomic frequency standard usable in such a system, once synchronized, could maintain the required timing accuracy for periods of only about one day, after which they would have to be resynchronized. Atomic frequency standards also have several other inherent disadvantages since they would greatly add to the weight of the equipment to be carried by the aircraft. These instruments are also very complex and very expensive.

The present invention accomplishes the aforesaid objectives of providing range and bearing information without the use of a separate frequency standard on each aircraft and at each beacon. In the present invention, all of the airborne transmitters within the range of a ground station are synchronized with the ground station transmitter by electronic devices carried in the aircraft utilizing only those transmissions which are already present in existing pulse-beacon navigation system. Additionally, all of the ground stations may be themselves synchronized to one another, and, therefore, all of the aircraft transmitters will be synchronized with each other.

It is therefore an object of this invention to provide an aircraft range-indicating collision avoidance system.

It is a further object of the invention to provide means for indicating the range between aircraft, particularly of the one-way type, requiring only reception from the aircraft whose range is being measured, without any transmission from the measuring aircraft to the aircraft being measured.

Another object of this invention is to provide a collision avoidance system for aircraft which is compatible with presently existing aircraft radio navigational systems.

Yet another object of the invention is to provide a pilot warning system for aircraft which alerts the pilot of an aircraft to the possible danger of an impending collision, the system being compatible with presently existing aircraft radio navigation aids.

It is a further object of the present invention to provide improvements for Tacan systems, to add the capability of measuring and indicating inter-aircraft ranges.

Still a further object of this invention is to provide a collision avoidance system for aircraft in which the aircraft radio navigation transmitters are synchronized with a common ground transmitter.

Yet a further object of this invention is to provide an air traffic control system in which the navigation transmitters in an aircraft are synchronized with a common ground station so that the ground station can ascertain the range and bearing of every aircraft within the range of the ground station.

Still a further object of the invention is to provide a system wherein a plurality of aircraft can determine the range and bearing with respect to other aircraft in the vicinity.

Other objects and advantages of the present invention will become more apparent upon reference to the following specification and annexed drawings, in which:

FIGURE 5 is a detailed block diagram of the frequency and phase control circuit of FIGURE 4.

Figure 1:
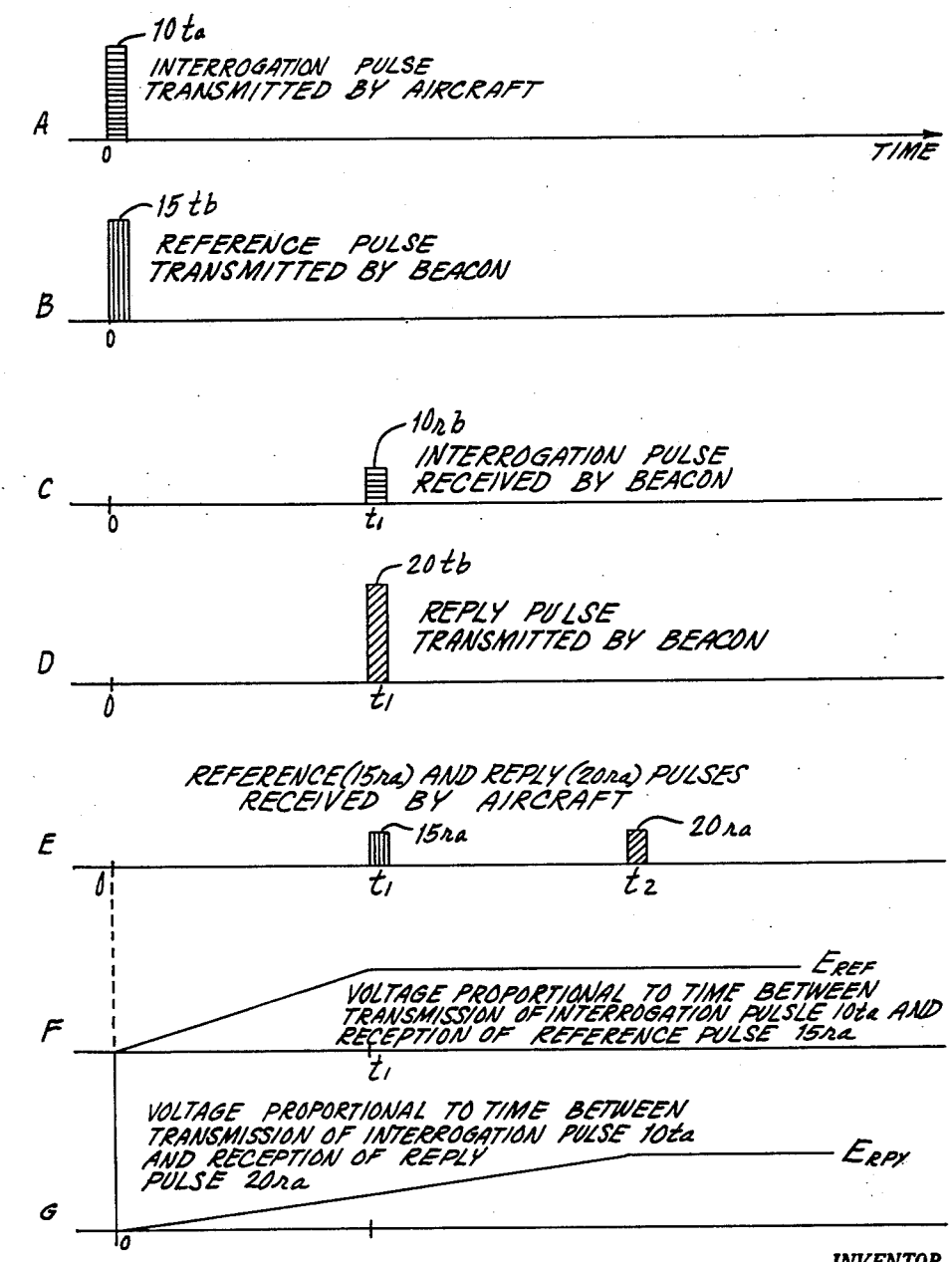
FIGURES 1A–1G show the time relationship of various pulses when the aircraft transmitter is in synchronism with the ground station.

Referring to FIGURE 1, the basic transmission signals which make up an aircraft radio navigation system are shown. While the present invention is to be described as used with a Tacan system, it should be realized that it is not limited thereto but that it has applications with respect to other types of radio navigation systems including those using distance measuring equipment. The navigation system transmissions include an interrogation pulse which is transmitted by an aircraft transmitter and is designated by the reference number 10ta to signify transmitted from the aircraft. For clarity, this pulse is shown with a plurality of horizontal lines which have no electrical significance but merely identify the interrogation pulse for convenience in analyzing the operation of the system.

The second basic transmission pulse is the reference pulse which is transmitted by the ground, or beacon, station. This pulse is designated as 15tb. The reference pulse transmitted by the beacon is shown in FIG. 1B with a plurality of vertical lines in order to aid in understanding the operation of the invention.

The third signal transmission is the beacon reply pulses, designated 20tb and shown with a plurality of slanted lines in FIGURE 1D. The reply pulse 20tb is transmitted by the beacon in response to an interrogation pulse. The interrogation pulse 10rb received by the beacon is shown in FIGURE 1C. Received pulse 10rb is of lesser amplitude than transmitted pulse 10ta since it is attenuated in space.

While navigation systems such as Tacan normally transmit pairs of pulses with prearranged spacing to increase the average power radiated and to make the system less susceptible to errors or interference caused by false signals, these pulse pairs are omitted for the purpose of clarity. It should be realized that the system of the present invention can operate on both single pulse and group pulse transmission.

For the purpose of explaining the principles of operation of the invention, consider that the interrogation pulse 10ta and the beacon reference pulse 15tb are initially synchronized, as shown on lines A and B of FIGURE 1. These pulses occur simultaneously at time $t_0=0$. At time $t=t_1$, the beacon reference pulse 15ra is received by the aircraft (FIGURE 1E) and the aircraft interrogation pulse 10rb is received by the beacon (FIGURE 1C). Both of these received pulses are attenuated in space. The time $t_1$ is equal to the slant range between the aircraft and the beacon divided by the velocity of propagation of the medium through which the signal is transmitted.

After the beacon received the interrogation pulse 10rb (FIGURE 1C) it transmits a reply pulse 20tb in response to it (FIGURE 1D). In this discussion, it is assumed that the reply pulse is initiated simultaneously with the reception of the interrogation pulse. Actually there is some time delay, but this is compensated in the system so as to have no effect and hence it can be ignored. Reply pulse 20ra is picked up by the aircraft radio navigation receiver (FIGURE 1E) at time $t_2$. The time $t_2-t_1$ is equal to the distance between the beacon and the aircraft divided by the velocity of propagation of the medium through which the beacon reply pulse is transmitted.

Circuits are provided in the aircraft to measure the time between the transmission of its interrogation pulse 10ta and the reception of the reference pulse 15ra and the time between transmission of the aircraft interrogation pulse 10ta and the reception of the beacon reply pulse 20ra. These two times are respectively designated $T_{REF}$ and $T_{RPY}$. The aircraft time measuring circuits may be any of a number of suitable types of circuits including an analog circuit such as, for example, a capacitor on which a voltage is stored which is representative of time. The voltages so produced representative of the respective times are designated $E_{REF}$ and $E_{RPY}$. In the latter type of circuit a capacitor starts charging toward a fixed potential on the transmission of the interrogation pulse and the charging is terminated by the receipt of the reference or reply pulse. The charge on the capacitor is therefore proportional to the time between the transmission of the interrogation pulse and the reception of the reference or reply pulse.

When the interrogation pulse 10ta and the beacon reference pulse 15tb are initially synchronized, as is the presently assumed case, $T_{RPY}$ equals $2T_{REF}$. This is apparent when it is considered that $T_{REF}$ is the time between transmission of the beacon reference pulse, at $t_0=0$, and the reception of the reference pulse by the aircraft at $t=t_1$. This time $t_1-t_0$ (which is, $T_{REF}$) seconds is equal to the slant range between the aircraft and the beacon divided by the velocity of propagation of the medium through which the reference pulse is transmitted. Since the reference pulse and the interrogation pulse are initially synchronized, it will take the same length of time for the interrogation pulse, transmitted at $t=t_0$, to travel from the aircraft to the beacon as it took for the reference pulse to travel from the beacon to the aircraft. Upon receipt of the interrogation pulse at time $t_1$ seconds, the beacon transmits the reply pulse (at time $t_1$ seconds). The reply pulse is received at the aircraft at time $t_2$ seconds and the time for the reply pulse to travel from the beacon to the aircraft is the same as the time which it took the reference pulse to travel from the beacon to the aircraft or the interrogation pulse from the aircraft to the beacon; i.e. $t_1-t_0=t_2-t_1$. Therefore, since the interrogation pulse was initially synchronized with the beacon reference pulse, the time $T_{RPY}$ between transmission of the interrogation pulse ($t=t_0$ seconds) and the receipt of the reply pulse ($t=t_2$ seconds) is equal to twice the time $T_{REF}$ between the transmission of the beacon reference pulse and its reception by the aircraft. Therefore, for the synchronized case, $T_{REF}$ is equal to $t_1-t_0$ seconds, $T_{RPY}$ is equal to $t_2-t_0$ seconds and $T_{RPY}=2T_{REF}$.

If the circuit which produces the voltage representative of $T_{RPY}$ operates at half the rate of the circuit on which the $T_{REF}$ voltage is produced, at the instant of reception of the reply pulse 20ra the voltage stored on the two capacitors should be identical: i.e., $E_{REF}$ equals $E_{RPY}$.

This is true because due to the initial synchronization of the pulses $t_1-t_0=t_2-t_1$ and $t_2-t_0=2(t_1-t_0)$, or $T_{RPY}=2T_{REF}$, since $T_{REF}=t_1-t_0$ and $T_{RPY}=t_2-t_0$ in this example.

When the interrogation pulse 10*ta* and the reference pulse 15*tb* are not synchronized, a voltage difference appears on the two capacitors after the reception of reply pulse 20*ra*. This voltage difference is used in the present invention to bring the transmission of the interrogation pulse 10*ta* into synchronism with the transmission of the beacon reference pulse 15*tb* by a suitable arrangement, such as a servo-mechanism system.

FIGURE 1F shows the voltage analog which is proportional to the time between transmission of interrogation pulse 10*ta* and the reception of the beacon reference pulse 15*ra*. The linear rise of the voltage stops upon reception of pulse 15*ra* and levels off. This is voltage $E_{REF}$. FIGURE 1G shows the voltage analog which is proportional to the time between transmission of the interrogation pulse 10*ta* and the reception of reply pulse 20*ra*. In this case, the linear voltage rise occurs at one-half the rate of that of FIGURE 1F and stops with the receipt of pulse 20*ra* and levels off at $E_{RPY}$. In the present case, since pulses 10*ta* and 15*tb* were initially synchronized, $E_{REF}=E_{RPY}$, which shows that $T_{RPY}=2T_{REF}$.

Figure 2:
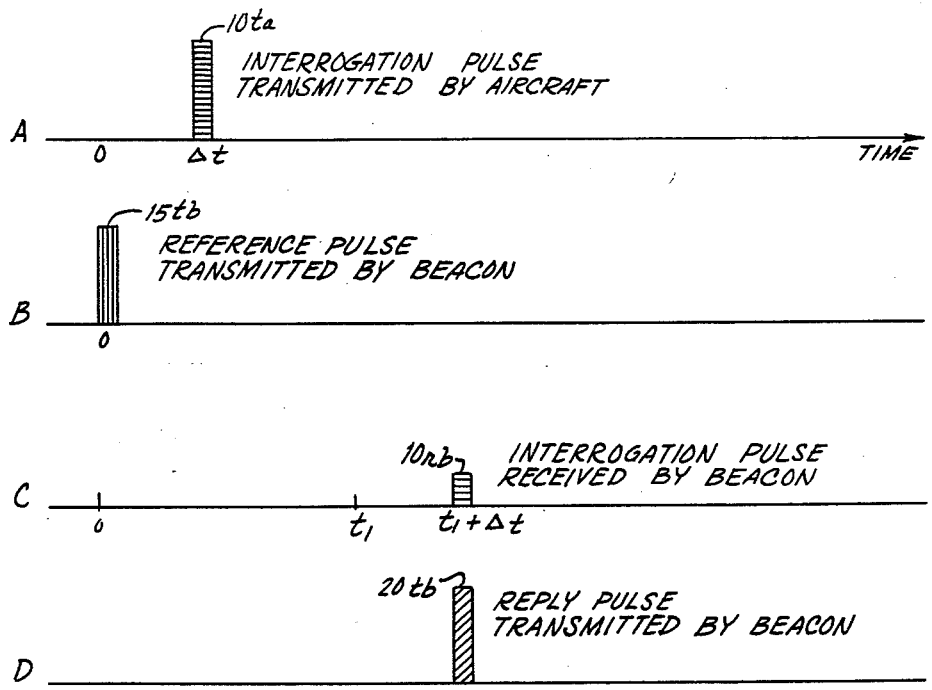
FIGURES 2A–2G show the time relationship of various pulses when the aircraft transmitter is not synchronized with the beacon transmitter, due to the aircraft interrogation pulses lagging the beacon reference pulse by a time $\Delta t$.
Figure 3:
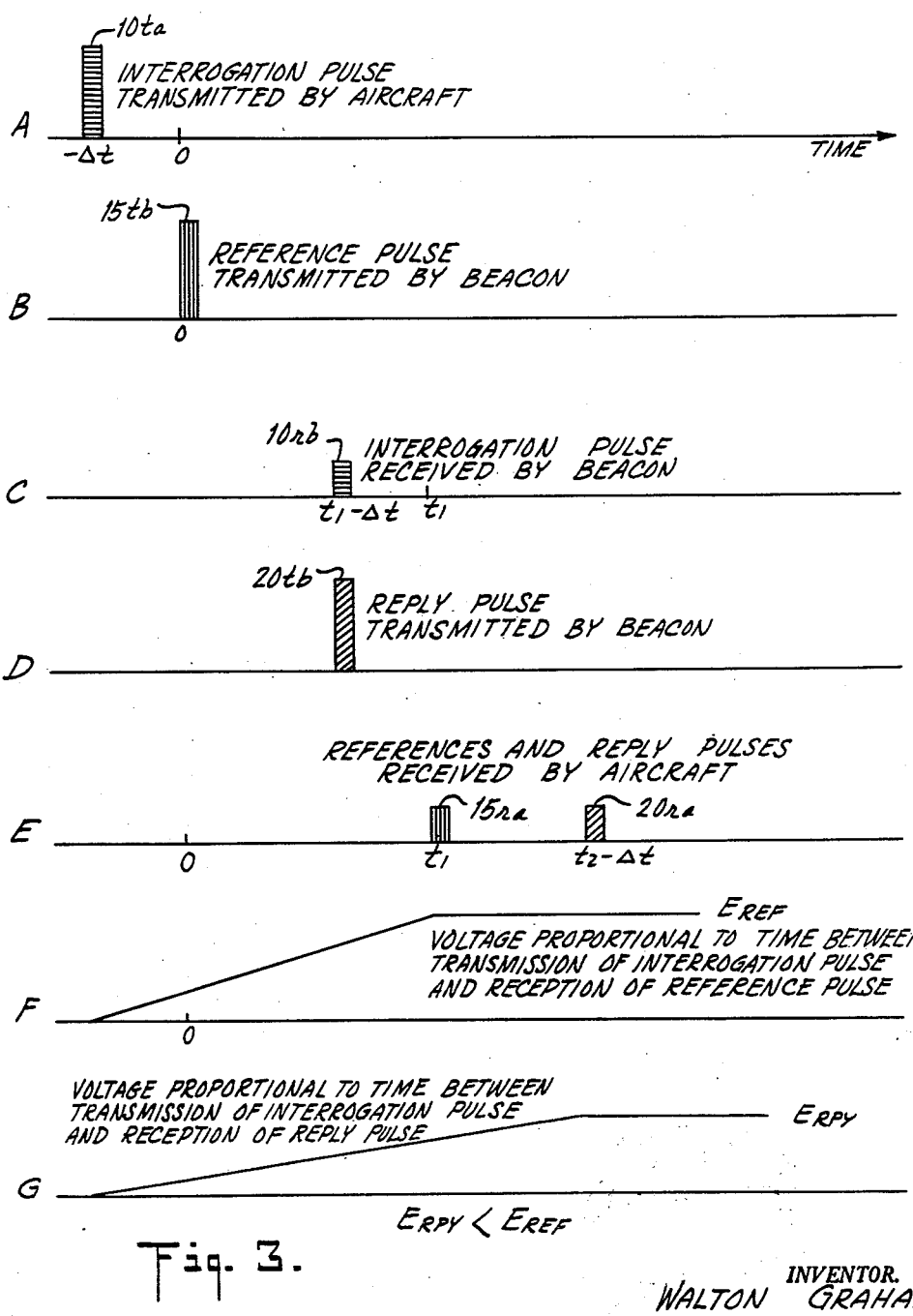
FIGURES 3A–3G show the time relationship of various pulses when the aircraft transmitter is not synchronized with the beacon transmitter, due to the aircraft interrogation pulses leading the beacon reference pulse by a time $\Delta t$.

FIGURES 2 and 3 illustrate how an error voltage is developed when the interrogation and reference pulses are out of synchronism. In FIGURES 2A–2B, the interrogation pulse 10*ta* is shown transmitted later than the beacon reference pulse 15*tb* by a time $\Delta t$. The interrogation pulse 10*ta* travels to the beacon in a time $t_1$ and upon receipt of the interrogation pulse (FIGURE 2C) at time $t_1+\Delta t$ the beacon sends out reply pulse 20*tb* (FIGURE 2D). The reference pulse 15*ra*, transmitted by the beacon at $t=t_0=0$, is received by the aircraft at time $t_1$, as shown in FIGURE 2E, and the beacon reply pulse 20*ra* is received by the aircraft at time $t_2+\Delta t$.

The time between transmission of the interrogation pulse 10*ta* and reception of the reference pulse 15*ra*, called $T_{REF}$, is measured as shown in FIGURE 2F. It can be seen that the voltage analog $E_{REF}$ starts to be formed at time $\Delta t$, the time of transmission of interrogation pulse 10*ta*. $E_{REF}$ levels off at the time of reception ($t_1$) of reference pulse 15*ra*.

The time between transmission of interrogation pulse 10*ta* and reception of reply pulse 20*ra*, called $T_{RPY}$, is shown in FIGURE 2G. The voltage analog $E_{RPY}$ for this time which is formed at half the rate of $E_{REF}$, begins to be developed at time $\Delta t$, the time of transmission of interrogation pulse 10*ta*, and ends at the reception of the beacon reply pulse 20*ra* at time $t_2+\Delta t$. As can be seen, due to the late occurrence of interrogation pulse 10*ta*, $E_{RPY}$ is greater than $E_{REF}$.

Comparing FIGURES 1 and 2, it is seen that $$T_{RPY}=(t_2+\Delta t - \Delta t)$$

is unchanged by the loss of synchronization, but $$T_{REF}=(t_1-\Delta t)$$

is a function of the error in synchronization. When the interrogation pulse 10*ta* is late, the voltage $E_{RPY}$ is greater than $E_{REF}$. The other situation of interrogation pulse 10*ta* being early by the time $\Delta t$ is illustrated in FIGURE 3. In this case, $E_{REF}$ is greater than $E_{RPY}$.

Referring to FIGURES 3A and 3B, the beacon reference pulse 15*tb*, transmitted at $t=t_0=0$ seconds, lags the aircraft's interrogation pulse 10*ta*, transmitted at $t=-\Delta t$, by time $\Delta t$. At time $t_1-\Delta t$ (FIGURE 3C) interrogation pulse 10*rb* is received by the beacon and the beacon transmits a reply pulse 20*tb* at the same time (FIGURE 3D). Reference pulse 15*ra* is received by the aircraft at time $t_1$ (FIGURE 3E). The time $t_1$ is equal to the slant range between the aircraft and the beacon divided by the velocity of propagation. Reply pulse 20*ra* is received by the aircraft at time $t_2-\Delta t$ (FIGURE 3E) since the interrogation pulse 10*ta* was early by time $\Delta t$.

FIGURE 3F shows the development of the voltage analog $E_{REF}$ proportional to the time ($T_{REF}$) between transmission of interrogation pulse 10*ta* and reception of reference pulse 15*ra*. The production of this voltage begins at the time, $t=-\Delta t$, of transmission of interrogation pulse 10*ta*, and terminates at time $t_1$, the reception of the beacon reference pulse 15*ra*. The development of $E_{RPY}$ is shown in FIGURE 3G. Here, the voltage, which is developed at half the rate of $E_{REF}$, is proportional to the time between transmission of interrogation pulse 10*ta* and reception of reply pulse 20*ra*, $T_{RPY}$. This voltage begins to be developed at time $t=-\Delta t$ and terminates upon reception of reply pulse 20*ra*, $t=t_2-\Delta t$. It can be seen, in FIGURES 3F and 3G, that for the situation of the interrogation pulse 10*ta* leading the beacon reference pulse 15*tb*, $E_{RPY}$ is less than $E_{REF}$.

Summarizing the unsynchronized conditions of the interrogation and reference pulses shown in FIGURES 2 and 3, when the interrogation pulse is transmitted later than the beacon reference pulse, the pulses 15*ra* and 20*ra* received by the aircraft are spaced further apart, proportional to the amount of delay. This is manifested in the aircraft's time measuring circuits by $E_{RPY}$ being greater than $E_{REF}$. When the interrogation pulse transmitted by the aircraft leads the beacon reference pulse, the pulses received by the aircraft are spaced closed together. This is indicated in the analog time measuring circuits by $E_{RPY}$ being less than $E_{REF}$. In each case, for a given range $E_{RPY}$ will be the same, but $E_{REF}$ and hence their difference or ratio is dependent upon whether the interrogation pulse transmitted by the aircraft lags or leads the beacon reference pulse.

The above analysis was made with the aircraft assumed stationary with respect to the beacon transmitter. The analysis below takes into consideration the effects of aircraft motion with respect to the beacon transmitter and shows that the original analysis is still valid. Consider first that the interrogation and reference pulses 10*ta* and 15*tb* are synchronized, and that the aircraft has a component velocity, V, toward the beacon. The time $T_{REF}$ is now:

$$(1) \qquad T_{REF}=\frac{R}{C}-\frac{VR}{C^2}$$

where R is the initial range and $VR/C$ is the distance (to the first order) that the range changes during propagation of the reference pulse 20*tb* from the beacon to aircraft, and C is the velocity of propagation.

The time $T_{RPY}$ will now be:

$$(2) \qquad T_{RPY}=\frac{2R}{C}-\frac{2VR}{C^2}=2T_{REF}$$

In order to further explain the effects of aircraft motion, consider the situation where the aircraft is moving toward a fixed beacon with velocity V, and that the synchronized interrogation and reference pulses 10*ta* and 15*tb* are transmitted at an instant when the two stations are a distance R apart. Between the time of transmission of the reference pulse by the beacon and its reception by the aircraft, $T_{REF}$, the aircraft will move a distance $VT_{REF}$ towards the beacon. From this it follows that:

$$(2.1) \qquad T_{REF}=\frac{R-VT_{REF}}{C}$$

where the numerator on the righthand side of the equation equals the actual distance traveled by the reference pulse, which, divided by the velocity of propagation C, gives the time for the reference pulse to travel from the beacon to the aircraft, $T_{REF}$. Equation 2.1 reduces to:

$$(2.2) \qquad T_{REF}=\frac{R}{C+V}$$

This time, $T_{REF}$, is to be compared with the time of arrival of the reply pulse transmitted by the beacon, $T_{RPY}$ and it is to be shown that $T_{RPY}=2T_{REF}$ when the reference and interrogation pulses are synchronous. In order to find $T_{RPY}$ the time of arrival of the interrogation pulse at the beacon, $T_I$, and the time for the reply pulse to travel from the beacon back to the aircraft, $T_X$ must be found. $T_{RPY}$, which is the time of arrival of the reply pulse at the aircraft measured from the time of transmission of the interrogation pulse by the aircraft, is given by:

(2.3)  $T_{RPY} = T_I + T_X$

Since the interrogation pulse was transmitted when the aircraft was a distance R from the beacon:

(2.4)  $T_I = R/C$ the time of propagation being unaffected by subsequent motion of the aircraft, and the beacon being stationary. Upon reception of the interrogation pulse the beacon transmits the reply pulse which takes a time $T_X$ to reach the aircraft. During the time from the instant of transmission of the interrogation pulse to its reception at the beacon the aircraft moves a distance $VT_I$. During the time from the instant of transmission of the reply pulse by the beacon to its reception at the aircraft the aircraft will move an additional distance $VT_X$. We have therefore:

(2.5)  $T_X = \dfrac{R - VT_I - VT_X}{C}$ where the numerator equals the distance traveled by the reply pulse in going from the beacon to the aircraft. This equation simplifies to:

(2.6)  $T_X = \dfrac{R - VT_I}{C + V}$

Substituting Equation 2.4 and Equation 2.6 in Equation 2.3 gives:

$$T_{RPY} = \frac{R}{C} + \frac{R - VR/C}{C + V} = \frac{2R}{C + V} = 2T_{REF}$$

This result corresponds to that given in Equation 2 above.

The above analyses also hold for an aircraft having a component velocity away from the beacon and can be carried out by substituting $-V$ for $V$ in this case.

Therefore, when the interrogation and reference pulses 10ta and 15tb are synchronized, the round trip interrogation pulse-reply pulse propagation time is twice the reference pulse propagation time from the beacon to the aircraft, with or without motion of the aircraft.

Figure 4:
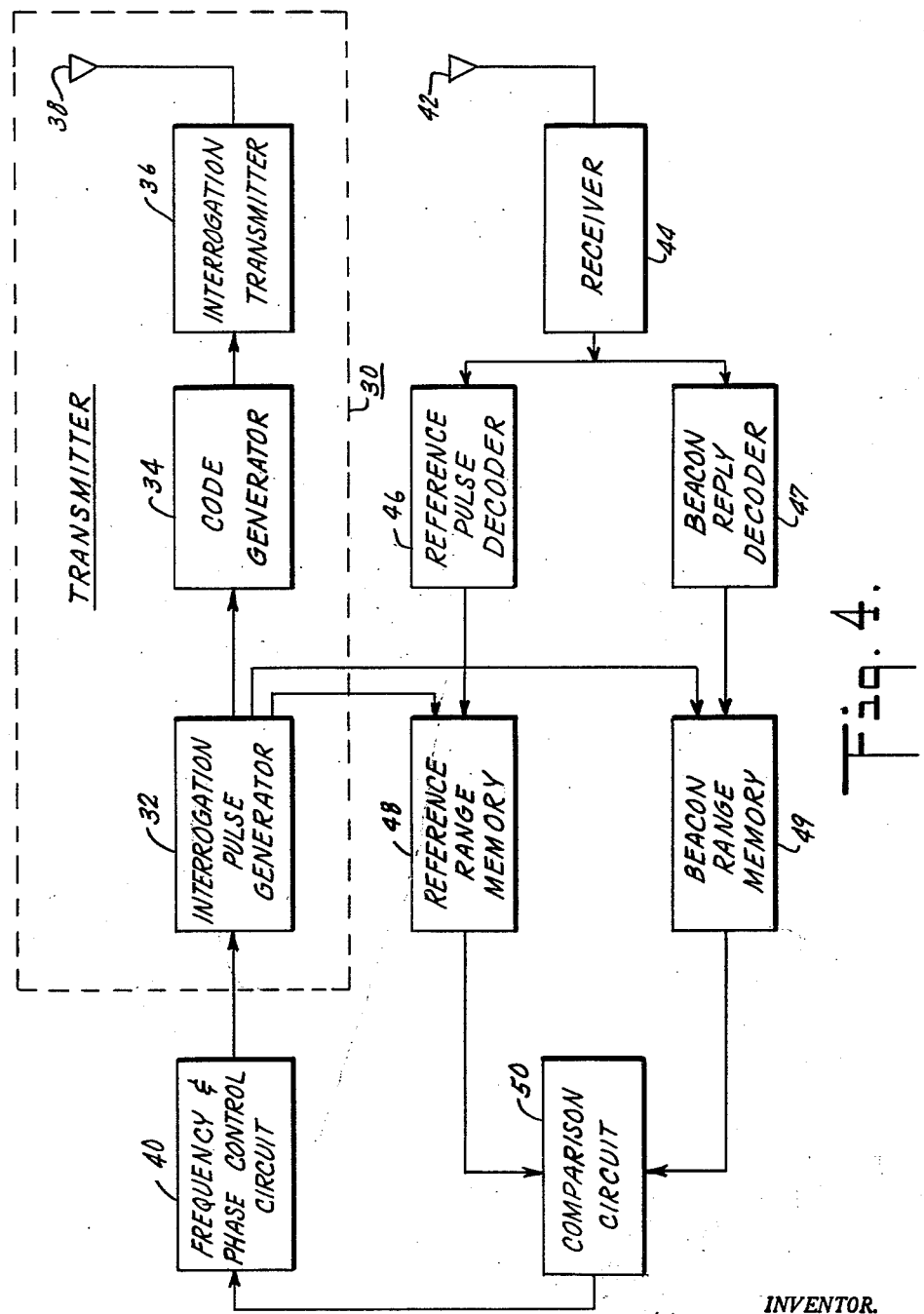
FIGURE 4 is a block diagram of the aircraft transmitter-receiver synchronization system.

Referring now to FIGURE 4, a system is shown for use in the aircraft for keeping the frequency and phase of the aircraft's interrogation pulse in synchronism with the beacon reference pulse. In FIGURE 4, the transmitter portion of the aircraft system is shown within the dotted rectangle 30. The transmitter has an interrogation pulse generator 32 which is any of the well-known forms of pulse generators, for example, a multi-vibrator circuit. The phase and frequency of the interrogation pulse generator circuit 32 is synchronized with the beacon reference pulse generator by a frequency and phase control circuit 40. The output of the interrogation pulse generator 32 is supplied to a code generator 34 where it may be encoded to represent only this one aircraft. This may be accomplished by selecting randomly only certain pulses from the repetitive pulses produced by generator 32. The coded output from the code generator 34 is applied to the input of an interrogation transmitter 36 where it modulates a carrier wave. The modulated carrier wave is amplified to a suitable level and is transmitted into space by an antenna 38 to interrogate a ground beacon station (not shown).

The beacon transmits reference and reply pulses which are picked up by a receiving antenna 42 which is connected to the input of the radio navigation system receiver 44. The construction of a ground beacon station of the Tacan type is well known in the art and no further description is needed here. The receiver 44 has the usual conventional circuitry for amplifying the received pulse signals. The output of the receiver 44 is split into two paths, one going to the beacon reference pulse decoder 46 and the other to the beacon reply pulse decoder 47. The reply pulse which is transmitted by the beacon in response to a particular aircraft's interrogation pulse, is selected by that aircraft's beacon reply decoder 47 from reply pulses transmitted by the beacon in response to the interrogation pulses from other aircraft. This is accomplished in the beacon reply decoder 47 by the usual search-track circuits which are common in Tacan navigation receivers. This is described in detail in the afore-mentioned article "Principles of Tacan."

Figure 6:
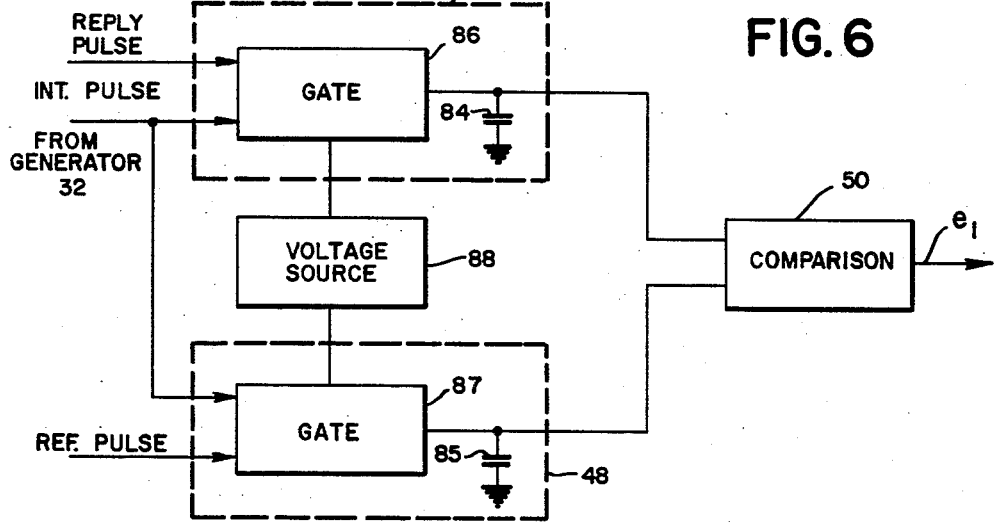
FIGURE 6 shows details of one form of circuit for measuring the time between two pulses in terms of a voltage.

The output of the beacon reply decoder 47, which is the selected reply pulse, shown as pulse 20ra in FIGURES 1, 2 and 3, is applied to the input of a beacon (reply) range memory circuit 49. Memory circuit 49 also receives interrogation pulses at another one of its inputs from the interrogation pulse generator 32. The reply range memory circuit 49 measures the time interval between the transmission of the interrogation pulse and the reception of the reply pulse from the beacon, in the same manner as in a conventional Tacan receiver, and reduces the $E_{RPY}$ voltage therefrom. As previously stated, and as shown in detail in FIGURE 6, the range circuit 49 can include a capacitor 84 which charges during the time interval between these two pulses. For example, the occurrence of an interrogation pulse from the generator 32 opens a gate circuit 86 which connects the capacitor to a source of charging potential 88. The capacitor then charges at a rate dependent upon its time constant circuit. The appearance of a reply pulse at the output of the beacon reply decoder 47 then terminates the charging of the capacitor by closing the gate circuit. A voltage therefore appears on the capacitor which is proportional to the elapsed time between the transmission of the interrogation pulse and the reception of the reply pulse.

In a similar manner a reference pulse decoder circuit 46 selects the beacon reference pulse. The decoder 46 is identical in every aircraft. In general, each beacon transmits at a specific assigned operating frequency, so that the receiver 44 can be tuned to receive only the transmission from the desired beacon.

The output of the reference pulse decoder 46 is connected to the input of the reference range memory circuit 48, which also receives as a second input the output of the interrogation pulse generator 32. The reference range memory circuit 48 is similar to the beacon range memory circuit 49 and measures $T_{REF}$ by producing the $E_{REF}$ voltage and operates in a manner similar to the reply range memory circuit 49 by charging a capacitor 85 from voltage source 88 through a gate 87. The interrogation pulse opens the gate and the reference pulse closes it. However, the circuit 48 charges at twice the rate of circuit 49 in order to make $E_{REF} = E_{RPY}$ when $T_{RPY} = 2T_{REF}$; i.e., when the reference and interrogation pulses are synchronized.

The outputs of the memory circuits 48 and 49 are applied to the input of a comparison circuit 50 which compares the two output voltages, preferably by taking the difference between them, and applies the resultant error voltage to the frequency and phase control circuit 40. The difference circuit may be any suitable circuit, a variety of which is already known to those skilled in the art. The magnitude and polarity of the error voltage which is produced by the comparison circuit 50 determines the correction to be made to the frequency and phase of the output of the interrogation generator 32. As previously described, when the interrogation pulse and beacon reference pulse are in synchronism $E_{REF} = E_{RPY}$. In this instance, the comparison circuit 50 has no output and there is no signal applied to the frequency and phase control circuit 40 to change the frequency and/or phase of the interrogation pulse generator 32. When the interrogation pulse is not in synchronism with the beacon reference pulse, $E_{RPY}$ is greater or less than $E_{REF}$. This means that circuit 50 produces an error voltage which is supplied to the frequency and phase control circuit 40.

The system shown in FIGURE 4 compares the time differences between $T_{RPY}$ and $T_{REF}$ and adjusts the frequency and phase of the interrogation pulse generator 32, so that $T_{RPY}=2T_{REF}$. In actual practice, a fixed delay $\Delta t_B$ occurs in the beacon to allow for decoding the interrogation pulse received from the aircraft. This delay is common to all beacons and is compensated for in the aircraft by initiating measurement of $T_{RPY}$ and $T_{REF}$ at $\Delta t_B$ seconds before transmission of the interrogation pulse. This can be accomplished by any suitable means, such as a delay line. The servo system of FIGURE 4 then works as previously described.

In FIGURE 5, a frequency and phase control circuit for use with the system of FIGURE 4 for maintaining synchronism between the interrogation and reference pulses is shown in greater detail. The system of FIGURE 5, which is a servomechanism loop, compensates for the effect of aircraft motion on the synchronization of the pulses. In FIGURE 5, consider that the beacon is transmitting reference pulses at a pulse rate $f_r$. Due to the motion of the aircraft, this rate is shifted upon reception, by the Doppler effect, to a new rate $f_i$.

The repetition rate of the pulses picked up by the aircraft receiver, considering the Doppler effect to the first order, is given as follows:

$$(3) \qquad f_i = f_r\left(1+\frac{V}{C}\right)$$

In FIGURE 5, the received reference pulses at rate $f_i$, which are separated out by the reference pulse decoder 46 of FIGURE 4, are supplied to the reference range circuit 48. Reference range circuit 48 also receives pulses from the interrogation pulse generator at a frequency $f_g$. As described with respect to FIGURE 4, range circuit 48 produces a voltage $E_{REF}$ which is proportional to the time between the production of an interrogation pulse by the generator 32 and the reception of a reference pulse from the beacon. This voltage is designated $E_{REF}=KT_{REF}$, where K is a constant. Similarly, the beacon reply pulses are separated out by the reply pulse decoder 47 and applied to the reply range circuit 49 which generates a voltage $$E_{RPY}=\frac{K}{2}T_{RPY}$$

This means that circuit 49 operates at one-half the rate of circuit 48. The outputs of the reference and reply range circuits 48 and 49 are applied to the comparison circuit 50 which takes the difference between the two voltages $E_{RPY}-E_{REF}$ and produces an error voltage $e_1$. The error voltage is smoothed out in a low pass filter 55 and then used to control a motor 57. Motor 57 drives a phase shifter network 59, which is connected to the output of the phase locked interrogation oscillator 53.

Oscillator 53 operates at a frequency $f_i$, which is the repetition rate of the received beacon reference pulses after taking the Doppler effect into account. The oscillator 53 is locked onto this frequency in a well-known manner by the reference pulses received by the aircraft and supplied over line 60. The phase of the oscillator 53 output is controlled by phase shifter 59.

Since the reference pulses are generated at the beacon at a frequency $f_r$, which is different from the frequency $f_i$ of the interrogation pulses produced by the aircraft oscillator 53, the interrogation and reference pulses drift out of synchronism. This drift is detected in the comparison circuit 50, in the manner described with respect to FIGURE 4 and in accordance with the analysis evolved with respect to FIGURES 1, 2 and 3.

The drift of the interrogation and the reference pulses is corrected by the phase shifter network 59 which is driven by the motor 57 in response to the comparison circuit 50 error signal. In a time T seconds the two pulses drift apart by a time $\tau_1$ given by:

$$(4) \qquad \tau_1 = +\frac{f_d}{f_i}T = +\frac{f_r V T}{f_i C}$$

where $f_d$ is the Doppler shift in $f_i$ given by:

$$(5) \qquad f_d = f_r\frac{V}{C}$$

and $f_d/f_i$ is the resulting fractional change in frequency.

In order to compensate for this drift, a compensating phase change must be introduced by the phase shifter 59. The phase shifter 59 produces a time shift in the production of the interrogation pulse of $\tau_2$ given by:

$$(6) \qquad \tau_2 = \frac{1}{f_i}\frac{\phi}{2\pi}$$

where $1/f_i$ is the period of the frequency $f_i$, and $\phi/2\pi$ is the fraction of the period due to a phase shift of $\phi$ radians.

For synchronism to be maintained:

$$\tau_2 = \tau_1$$

or $$(7) \qquad \frac{1}{f_i}\frac{\phi}{2\pi} = -\frac{f_r V T}{f_i C}$$

giving:

$$(8) \qquad \frac{\phi}{2\pi T} = -\frac{f_r V}{C} = \frac{\phi}{2\pi}$$

where $\phi/2\pi$ is the equivalent frequency of the phase change $\phi$ in time T.

If $f_g$ is the resulting rate of the interrogation pulse generator 32:

$$(9) \qquad f_g = f_i + \frac{\phi}{2\pi} = f_i - f_r\frac{V}{C}$$

Substitution of $$f_i = f_r\left(1+\frac{V}{C}\right)$$

from Equation 3 gives:

$$(10) \qquad f_g = f_r\left(1+\frac{V}{C}\right) - f_r\frac{V}{C}$$

or $$(11) \qquad f_g = f_r$$

This shows that the interrogation pulse rate and phase from the generator 32 and the reference pulse from the beacon are identical.

In this way, the interrogation pulses are synchronized to the beacon reference pulses, so that each interrogation pulse on the aircraft can occur only simultaneously with the occurrence of a reference pulse at the beacon. This synchronism is of course maintained despite any variations in range of the craft from the beacon, and independent of the velocity of the craft. It should be kept in mind that the received reference pulse and the interrogation pulse occur at times spaced by $t_1$ at the craft, and $t_1$ will vary with the range between the craft and the beacon station.

In this way the transmitters of all aircraft are synchronized with the same ground beacon transmitter, or as shown below with a plurality of synchronized ground beacon transmitters, so that all the interrogation and the reference pulses are transmitted at the same time. In essence, the beacon reference pulses serve as a standard to which all the aircraft transmitters are synchronized. Once the aircraft transmitters are synchronized with the same or a plurality of synchronized beacon transmitters, the measurement of range between aircraft with synchronized transmitters is readily accomplished. All that is necessary is to provide each aircraft with a range receiver for picking up the interrogation pulses from the other aircraft and the usual circuits for measuring the time between the occurrence of a local interrogation pulse (which occurs simultaneously with transmission of an interrogation pulse from another aircraft) and the reception of the interrogation pulse from the other craft. Since the interrogation pulses of all aircraft are synchronized, the measuring aircraft is provided with the initial point of a time base for measuring this time interval. The range between aircraft is merely the velocity of propagation of the signal multiplied by the measured time interval.

Describing a typical example of range measurement, consider that the measuring aircraft has a range receiver and an A-scope radar display and measuring system. The time measuring interval in the measuring aircraft is initiated by the transmission of its own interrogation pulse. At the same time, the aircraft whose distance is to be measured also transmits an interrogation pulse. When the interrogation pulse from the aircraft whose distance is to be measured is received, it is displayed on the face of the A-scope. The time and hence the range is then measured by conventional radar measuring techniques.

Typical circuits for conversion of time differences to range indications may be found in "Radar Systems Engineering" by Ridenour at p. 527 ff. and also in other standard texts of this nature. It should be noted that there is a difference between range measurements in the present system and that of a conventional radar system, since in the present system there is only one-way propagation of pulses from aircraft to aircraft, whereas in radar there is a two-way propagation of pulses from the transmitter to the reflecting object and back to the transmitter. As a result, in the present system a given time difference on the face of an A-scope corresponds to twice the range of that displayed on a conventional radar scope and is calibrated accordingly. It should also be realized that range may be displayed on a direct reading, digital type meter in a well known manner.

The receiver in each aircraft which receives the interrogation pulses transmitted by other aircraft need only be a low gain, wide band receiver. The gain of the receiver can be relatively low because each aircraft requires reception only out to a range necessary to avoid collision. This range varies in accordance with the relative speeds of the aircraft and can be varied accordingly, but in general is from 20–30 miles. If the present system is to be utilized with the existing Tacan system, the bandwidth of the aircraft receiver would extend from 1025 to 1150 mc., covering the presently existing 126 air-to-ground transmission channels.

As described above, once the pulses of the aircraft transmitters have been synchronized, each aircraft may readily determine the range from every other aircraft within the range of the low gain, wide band receiver of its range measuring equipment. In order to provide information for the collision avoidance system it may be desirable that each aircraft be able to ascertain the bearing to every other aircraft in the collision area. This may be accomplished by connecting an interferometric measuring device to the wide band receiver of the range measuring circuits. The interferometric device makes angular bearing measurements from the interrogation pulses received from other aircraft. Any suitable system may be utilized to obtain the bearing information. One such system is described in the "Proceedings of the Institute of Radio Engineers," June 1956, at page 755, where the measurement of the angle of the transmitter with respect to a set of radio receivers is accomplished by measuring the phase differences between signals at the receivers. It should be recognized that other suitable types of interferometric or radio bearing devices may also be utilized.

Figure 4A:
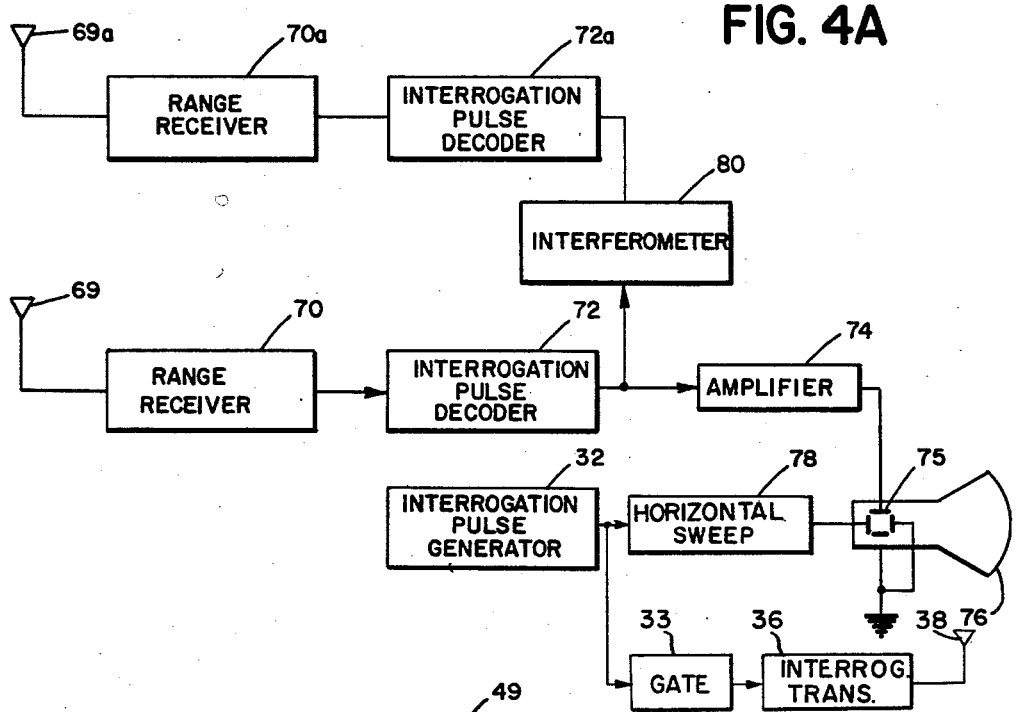
FIGURE 4A is a block diagram showing a portion of the system of FIGURE 4 and additional circuits for measuring range and bearing.

FIGURE 4A illustrates a system for measuring range and/or bearing using the present invention. Here, transmissions from other mobile stations are received by an antenna 69 connected to a range receiver 70 and the interrogation pulses are separated out by an interrogation decoder 72. The interrogation pulses are applied to an amplifier 74 and the amplified pulses are applied to one of the vertical deflection plates 75 of a cathode ray display tube 76. A horizontal sweep pulse is applied to the horizontal deflection plates from a horizontal sweep circuit 78. Since the time base of the display tube is triggered by the station's own interrogation pulse and since the interrogation pulses of all stations are in synchronism, the distance between the beginning of the time base and a displayed received interrogation pulse is proportional to range.

In FIGURE 4A a second antenna 69a, receiver 70a, and interrogation pulse decoder 72a are provided to supply signals together with those from decoder 72 to operate an interferometer 80 which measures bearing in the manner described by the aforementioned article in the Proceedings of the Institute of Radio Engineers.

The above discussion is based on the premise that two aircraft are not at substantially the same range from a beacon station. When this does occur, and both aircraft interrogate almost simultaneously the beacon will fail to reply to the later one of the two interrogation pulses received. This is so because in the normal Tacan system the beacon is designed to be unresponsive for a period of some 50 microseconds after it transmits a reply pulse. One purpose of this is to prevent multiple triggering of the beacon by reflections of the interrogation pulse from buildings or terrain near the beacon. This feature sets a limit on the maximum number of replies that the beacon can transmit, and hence sets a limit on the number of aircraft which can get range information from the same beacon. For this reason, it is desirable to maintain the time arrival of aircraft interrogation pulses at the beacon evenly distributed. This result, as is explained below, is achieved by increasing the number of allowable positions for transmission of interrogation pulses, by modifying the timing of the aircraft interrogation pulse transmissions. Consider that when an aircraft is in the track mode of operation it interrogates at a rate of 22.5 times per second. This rate is exactly $\frac{1}{6}$ the rate of the beacon reference pulses. In general, each aircraft does not transmit a pulse every successive $\frac{1}{22.5}$ second, but selects at random one of six instants every period of $\frac{1}{22.5}$ second. In the present invention, the beginnings of the six sub-intervals occurring every $\frac{1}{22.5}$ second are made coincident in time with the transmission of beacon reference pulses. Stated another way, each $\frac{1}{22.5}$ second major interval is divided into six sub-intervals making each sub-interval occur every $\frac{1}{135}$ second. The beginning of each of the sub-intervals is made coincident with the transmission of a beacon pulse, by synchronizing the interrogation pulses, transmitted at the rate of 22.5 p.p.s., with the beacon reference pulses in the manner previously described.

During successive $\frac{1}{22.5}$ second periods an air craft can interrogate at any one of the six sub-intervals. For example, during the first major $\frac{1}{22.5}$ second interval, the synchronized transmission may occur at the second beacon reference pulse time $t=\frac{1}{135}$ second, and during the second major interval the transmission of the interrogation pulse may accur at the fifth sub-interval which corresponds to time of the beacon reference pulse at $t=\frac{11}{135}$ second. Since random transmission of interrogation pulses by air craft at the same range is not likely to occur at the same subinterval during each major $\frac{1}{22.5}$ second interval, the probability is that only one reply pulse in six will be lost due to the presence of one other aircraft at the same range from the beacon. This is true because of the probability that only one interrogation pulse out of six from both aircraft will be simultaneously received by the beacon. When three aircraft are at the same range from the beacon, the probability would be that each receives beacon reply pulses to five out of every nine interrogation pulses, on the average.

Transimssoin utilizing random selection of one of the six sub-intervals during each $\frac{1}{22.5}$ second major interval may be accomplished with a system similar to the one shown in FIGURE 4. A system for accomplishing this is shown in FIGURE 4A. In this system, the interrogation pulse generator 32 would operate at 135 pulses per second and would be synchronized to the beacon reference pulses in the manner previously described. A randomly acuated gate 33 is interposed between the interrogation pulse generator 32 and the transmitter 36. The gate 33 passes one interrogation pulse to the transmitter 36 at the start of a randomly varying $\frac{1}{135}$ second sub-interval during each $\frac{1}{22.5}$ second interval. A gating arrangement of conventional type suitable for this operation may be used. It should be realized that one station receives a reply pulse only in response to a transmitted interrogation pulse so that synchronization will be accomplished in the manner described in FIGURE 4 only once during each $\frac{1}{22.5}$ second major interval and the generator 32 has sufficient stability to stay in synchronization until the next time when synchronization is to be accomplished during another interval. The range and bearing measurements may be accomplished with this type of system in the manner previously described since interrogation pulse generator 32 produces a pulse which triggers the sweep of display 76 at each allowable time of transmission of an interrogation pulse during the $\frac{1}{22.5}$ second major interval. In a preferred form of the invention, the aircraft transmitter is only synchronized during track mode of operation and is not synchronized during search mode.

Up to this point only the operation of aircraft with a single ground station has been considered. In practice, aircraft in close proximity to one another may interrogate different ground stations and these interrogations will not be synchronous unless the ground stations themselves have synchronous reference pulses. Since, ordinarily, the ground stations are beyond line of sight of each other, they are unable to receive each other's reference pulses and are therefore not able to synchronize on them. It is therefore necessary to find another means to synchronize all of the beacon stations so that the reference pulses are transmitted in synchronization.

One simple and effective means of accomplishing the required synchronization of the reference pulses of the beacon stations is by the use of auxiliary VLF (very low frequency) radio transmissions. These auxiliary C.W. (continuous wave) transmissions are received by the beacon station and used to synchronize them in a well known manner in which differences in distance between the beacons and the C.W. transmitter are compensated for by introducing fixed relays. In an article by John A. Pierce entitled "Intercontinental Frequency Comparison by Very Low Frequency Radio Transmission" appearing in the June 1957 edition of the Proceedings of the Institute of Radio Engineers at pages 794–803, it was disclosed that measurements made over a trans-Atlantic path (5400 kilometers) using a frequency of 16 kilocycles, (16,000 cycles) showed that the diurnal variation in transmission time has a standard deviation of the order of 2 microseconds from a mean curve. The overall deviation is 34±1 microsecond.

In the airborne navigation system of the present invention it is unnecessary to maintain synchronism over distances of the magnitude of 5400 kilometers since it is necessary that only the beacons which can possibly serve the same aircraft be sychronized. This means that the range between beacons is of the order of 400 miles and the variation in transmission time between such stations should be proportionately less than over the longer path. It is therefore possible by using the VLF transmissions to maintain synchronism of the beacons within one microsecond between stations requiring synchronism. This can be done with a simple programmed diurnal correction. Also, as is derived from Pierce's article, the transmitting power required of a centrally located VLF station which synchronizes all the beacons in the continental United States is less than 10 watts and the bandwidth required by such VLF service is less than 1 cycle per second.

Another means of synchronizing the beacon reference pulses is by using artificial satellites. In such instance the satellite is preferably of the type which is in a circular orbit in the equatorial plane of the earth with a 24 hour period. Communication transmissions are reflected from the satellite and used parasitically by the beacons to maintain synchronism. For example, a pulse code modulation system has timing pulses which can be used as reference pulses for the beacons. Since the range of each beacon to the satellite would be known, synchronism can be accomplished by having each station add a time delay to the transmission of its reference pulse which is equal to the difference between its own delay and the maximum delay of any beacon in the system. In this manner, all of the beacons are synchronized.

A third way of maintaining synchronism of the beacon reference pulses involves the use of additional equipment in the aircraft itself. It is only important for beacon stations to be synchronized when there are aircraft within line of sight of two or more beacons which are capable of triggering reply pulses from both beacons. It should be realized that Tacan transmissions are normally limited to line of sight and that aircraft within line of sight of only one beacon must use that particular ground station. Therefore, a system which depends for synchronization upon the presence of and transmissions from such aircraft can be realized. In accordance with the operation of the aircraft synchronization system described in FIGURES 4 and 5, when any aircraft is in the track mode all its interrogation pulses are synchronized with the beacon reference pulses of the beacon with which it is operating. It should be realized, however, in the Tacan system that when the aircraft is in the track mode the average pulse rate of the interrogation pulses is 22.5–30 cycles per second rather than the 135 cycles per second transmitted when the aircraft is in the search mode: i.e. searching for its own reply pulses. An aircraft which is in the track mode can therefore operate as a beacon itself for the purpose of synchronizing another transmitter, such as a beacon transmitter. Thus, if each beacon station has a receiver which is tuned to the frequency at which the aircraft interrogates other beacon stations, each beacon station will receive the interrogation pulses from aircraft operating with the other beacon stations and operate with these pulses as if they were reference pulses from a beacon station. Stated another way, the beacon also transmits a coded interrogation pulse to the aircraft, either on the frequency of the beacon with which it is synchronizing or on the frequency on which the aircraft is interrogating.

The aircraft responds to the reception of the coded interrogation pulse from the beacon by transmitting a coded reply pulse. The coded interrogation pulse from the beacon is accepted only by an aircraft at a single altitude and the coded reply pulse from the aircraft is accepted only by the beacon. The interrogation pulse transmitted by the beacon, and the reply and reference pulse transmitted by the aircraft are used at the beacon to bring the beacon interrogation pulse into synchronism with the aircraft coded reference pulse and hence with the true reference pulses of another beacon, in the same way that the reference, interrogation, and reply pulses are used to bring the aircraft interrogation pulse into synchronism with the beacon reference pulse.

It should be noted that synchronization of all beacon stations enables each aircraft to measure range to all beacons within line of sight while interrogating only one of them to maintain synchronism of the aircraft interrogation pulse with the beacon's reference pulse. This means that simultaneous range measurement to a number of fixed beacons is possible. A superior accuracy navigation fix can therefore be attained without the use of the Tacan system's bearing facility.

When the timing of the beacon reference pulses is shifted to maintain synchronism between beacon stations it is also necessary to adjust the drive of the rotating antenna pattern at the beacon so the relationship between the time of the occurrence of the maxima in the antenna pattern and of the reference pulses is preserved. Since the antenna pattern has a known shape, and the antenna is frequently a rotating cylindrical structure, it is simple to accomplish this, for example, by a servo system which controls the speed and phase of the antenna in accordance with the reference pulses. Such systems are well known in the art and need not be described here.

A system has therefore been described for the navigation of vehicles which is compatible with presently existing navigation systems, such as Tacan, and which also provides the added capabilities of pilot warning, collision avoidance and air traffic control. The system provides for the synchronization of all vehicle interrogation transmissions to the reference pulses transmitted by a fixed beacon. In accordance with the system a single interrogation-pulse carries range and bearing information and the navigation system is therefore not burdened with the transmission, reception, coding and decoding of extra pulses to transmit this information.

It should be realized that the particular diagrammatical circuit arrangements shown and described and the specific time values assigned to many of the pulse transmission sequences, have been so used in order to make the invention compatible with one type of presently existing navigation system. It should be realized that the principles of the present invention may be utilized with other types of navigation systems which use different pulse transmission and timing sequences. Therefore, it will be understood that the preferred embodiment of the invention described above is illustrative only and that the invention is to be limited solely by the appended claims.

What is claimed is:

1. The method of synchronizing transmissions from a first station to transmissions from a second station comprising the steps of transmitting first pulses from said first station, transmitting second pulses from said second station at a predetermined rate, transmitting third pulses from said second station in response to said first pulses, and synchronizing said first pulses to said second pulses in response to said second and third pulses.

2. The method of maintaining a predetermined relationship between a source of first pulses at a first location to a source of reference pulses at a second location, independently of the radio propagation time interval between said locations, the distance between said locations being variable, comprising the steps of radiating said reference pulses from said second location to said first location, radiating said first pulses from said first location to said second location, receiving said first pulses at said second location, radiating from said second location to said first location reply pulses having a fixed time relationship to said first pulses as received at said second location, and utilizing said first pulses, and said reference and reply pulses as received at said first location, to adjust the time of occurrence of said first pulses in relation to said reference pulses.

3. The method of maintaining a predetermined relationship between a source of first pulses at a first location to a source of reference pulses at a second location, independently of the radio propagation time interval between said location, the distance between said locations being variable, comprising the steps of radiating said reference pulses from said second location to said first location, radiating said first pulses from said first location to said second location, receiving said first pulses at said second location, radiating from said second location to said first location reply pulses having a fixed time relationship to said first pulses as received at said second location, and adjusting the time of occurrence of said first pulses in response to the relation between the time interval between each of said first pulses and a corresponding received reference pulse and the time interval between each of said first pulses and a corresponding received reply pulse.

4. The method of maintaining a predetermined relationship between a source of first pulses at a first location to a source of reference pulses at a second location, independently of the radio propagation time interval between said locations, the distance between said locations being variable, comprising the steps of radiating said reference pulses from said second location to said first location, radiating said first pulses from said first location to said second location, receiving said first pulses at said second location, radiating from said second location to said first location reply pulses having a fixed time relationship to said first pulses as received at said second location, and adjusting the time of occurrence of said first pulses to maintain a constant relation between the time interval between each of said first pulses and a corresponding received reference pulse and the time interval between each of said first pulses and a corresponding received reply pulse.

5. The method of maintaining a predetermined relationship between a source of first pulses at a first location to a source of reference pulses at a second location, independently of the radio propagation time interval between said locations, the distance between said locations being variable, comprising the steps of radiating said reference pulses from said second location to said first location, radiating said first pulses from said first location to said second location, receiving said first pulses at said second location, radiating from said second location to said first location reply pulses having a fixed time relationship to said first pulses as received at said second location, and adjusting the time of occurrence of said first pulses to maintain a constant ratio betwen the time interval between each of said first pulses and a corresponding received reference pulse and the time interval between each of said first pulses and a corresponding received reply pulse.

6. The method of synchronizing transmissions from a first station to transmissions from a second station comprising the steps of transmitting interrogation pulses from said first station, transmitting reference pulses at a predetermined rate from said second station, transmitting relay pulses from said second station in response to interrogation pulses from said first station, producing signals at said first station which are respectively representative of the time interval between transmission of each interrogation pulse and the reception of a reference pulse and of the time interval between transmission of each interrogation pulse and the reply pulse produced in response to said last mentioned interrogation pulse, and utilizing said signals to synchronize said interrogation pulses to said reference pulses.

7. In a collision avoidance, pilot warning and air traffic control system for use with a plurality of first stations the method of synchronizing the transmissions of a plurality of first stations to the transmission from a second station comprising the steps of transmitting first signals from each of said plurality of first stations, transmitting second signals from said second station at a fixed rate, synchronizing the first signals from each of said first stations to said second signals, and determining at one of said first stations the range, and bearing of another first station from its transmitted first signals.

8. In a pulse transmission system the combination comprising first means for producing a first pulse, second means for producing a second pulse, said second means also producing a third pulse in response to said first pulse, and means connected to said first means for synchronizing the production of said first and second pulses, said last named means being operative in response to second and third pulses.

9. In a pulse transmission system the combination comprising first means for transmitting first pulses, second means for transmitting second and third pulses, and means connected to said first means and responsive to said first, second and third pulses for synchronizing said first pulses with said second pulses.

10. In a radio navigation system having means for radiating first pulses from a first location and means for radiating reference pulses from a second location having a variable distance from said first location, means at said second location for radiating a reply pulse in response to reception of a radiated first pulse from said first location, apparatus at said first location for synchronizing said first pulses with said reference pulses independently of the time of radio propagation and of the distance between said locations comprising means for receiving said radiated reference and reply pulses from said second location at said first location, and means connected to said receiving means and to said means for radiating said first pulses for adjusting the times of occurrences of said first pulses at said first location in response to said received reference pulses, to said received reply pulses, and to said first pulses produced at said first location.

11. In a radio navigation system having means for radiating first pulses from a first location and means for radiating reference pulses from a second location having a variable distance from said first location, means at said second location for radiating a reply pulse in response to reception of a radiated first pulse from said first location, apparatus at said first location for synchronizing said first pulses with said reference pulses independently of the time of radio propagation and of the distance between said locations comprising means for receiving said radiated reference and reply pulses from said second location at said first location, and means connected to said receiving means and to said means for radiating said first pulses for adjusting the times of occurrences of said first pulses in response to the time interval measured between each of said first pulses and a corresponding received reference pulse and the time interval measured between each of said first pulses and a corresponding received reply pulse.

12. In a radio navigation system having means for radiating first pulses from a first location and means for radiating reference pulses from a second location having a variable distance from said first location, means at said second location for radiating a reply pulse in response to reception of each radiated first pulse from said first location, apparatus at said first location for synchronizing said first pulses with said reference pulses independently of the time of radio propagation and of the distance between said locations comprising means for receiving said radiated reference and reply pulses from said second location at said first location, first means connected to said receiving means and to said means for radiating said first pulses for deriving a first signal representative of the time interval between each of said first pulses and a corresponding received reference pulse, second means connected to said receiving means and to said means for radiating said first pulses for deriving a second signal representative of the time interval between each of said first pulses and a corresponding received reply pulse, and means connected to said first and second means and to said means for radiating said first pulses for adjusting the times of occurrence of said first pulses in response to said first and second signals.

13. In a radio navigation system having means for radiating first pulses from a first location and means for radiating reference pulses from a second location having a variable distance from said first location, means at said second location for radiating a reply pulse in response to reception of a radiated first pulse from said first location, apparatus at said first location for synchronizing said first pulses with said reference pulses independently of the time of radio propagation and of the distance between said locations comprising means for receiving said radiated reference and reply pulses from said second location at said first location, first means connected to said receiving means and to said means for radiating said pulses for deriving a first signal representative of the time interval between each of said first pulses and a corresponding received reference pulse, second means connected to said receiving means and to said means for radiating said first pulses for deriving a second signal representative of the time interval between each of said first pulses and a corresponding received reply pulse, and means connected to said first and second means and to said means for radiating said first signals for adjusting the times of occurrence of said first pulses to maintain a constant relationship between said first and second signals.

14. A system in a first station for use with a second station which transmits reference pulses at a fixed rate and reply pulses in response to interrogation pulses received from said first station, said first station comprising means for transmitting interrogation pulses, means for receiving said reference and reply pulses from said second station, means connected to said receiving means and to said means for transmitting said interrogation pulses for measuring the respective times between transmission of an interrogation pulse and the reception of a reference pulse and the reply pulse transmitted in response to an interrogation pulse and for producing signals representative thereof, and means responsive to said last named signals connected between said measuring means and said interrogation pulse transmitting means for synchronizing the transmission of said interrogation pulses with the transmission of said reference pulses by said second station.

15. In a navigation system a plurality of first stations each having means for transmitting interrogation pulses, a second station having means for transmitting reference pulses at a fixed rate, said second station also having means for transmitting a reply pulse in response to an interrogation pulse received from a first station, each of said first stations also having; means for receiving said reference and reply pulses from said second station, means connected to said receiver means and to said means for transmitting said interrogation pulses for measuring the respective times between transmission of an interrogation pulse and the reception of a reference pulse and the reply pulse transmitted in response to an interrogation pulse and for producing signals representative thereof, and means responsive to said last named signals connected to said measuring means and to said interrogation pulse transmission means for synchronizing the transmission of said interrogation pulses to the transmission of said reference pulses by said second station.

16. A pilot warning, collision avoidance and air traffic control system comprising a plurality of first stations each having means for transmitting interrogation pulses, a second station having means for transmitting reference pulses at a fixed rate, said second station also having means for transmitting a reply pulse in response to an interrogation pulse received from a first station, each of said first stations also having; means for receiving said reference and reply pulses from said second station, means connected to said receiver means and to said means for transmitting said interrogation pulses for measuring the respective times between transmission of an interrogation pulse and the reception of a reference pulse and the reply pulse transmitted in response to an interrogation pulse and for producing signals representative thereof, means responsive to said last named signals connected to said measuring means and to said interrogation pulse transmission means for synchronizing said interrogation pulses to said reference pulses, and means connected to said receiver means and to said means for transmitting said interrogation pulses for determining the range and bearing of a first station by the reception of its transmitted interrogation pulses.

17. In a radio navigation system having means for radiating first pulses from each of a plurality of first locations and means for radiating reference pulses from a second location, the distances between said second location and said first locations being variable, means at each of said first locations responsive to said reference pulses for synchronizing its first pulses to said reference pulses at said second location, and means at each of said first locations responsive to its own first pulses and to first pulses received from other first locations for indicating the ranges from said one first location to said other first locations.

18. In a radio navigation system having means for radiating first pulses from each of a plurality of first locations and means for radiating reference pulses from a second location, the distances between said second location and said first locations being variable, and also having means at said second location for radiating a reply pulse in response to reception of a radiated first pulse, apparatus at a first location for synchronizing said first pulses with said reference pulses independently of the time of radio propagation between and of the distance between said locations comprising first means for receiving said radiated reference and reply pulses from said second location at each of said first locations, means at each of said first locations connected to said first receiving means for adjusting the times of occurrence of its first pulses in response to said received reference pulses and to said received reply pulses, second means at one of said first locations for receiving said first pulses from others of said first locations, and means at said one first location connected to said first means and responsive to said received first pulses for indicating the ranges to others of said first locations.

19. In a radio navigation system having a beacon station and a plurality of mobile stations, each of said mobile stations having means for radiating predetermined first pulse signals, and said beacon station having means for radiating reference pulse signals and means for radiating reply pulse signals in fixed time relation to said first pulse signals when received at said beacon station, apparatus for permitting one mobile station to determine its range from other mobile stations, said apparatus comprising means at each mobile station for receiving said radiated reference and reply pulses from said beacon station and the first pulse signals from the other first stations, means connected to said receiving means and to said means for radiating said first pulse signals and responsive to said radiated reference and reply signals received by each of said mobile stations for synchronizing its first pulse signals to said reference signals, and means at said one mobile station connected to said receiving means and to said first pulse signal radiating means for indicating the time intervals between its own first pulses and first pulses received from other mobile stations, whereby said ranges are determined as a fraction of said time intervals.

20. In a radio navigation system having a beacon station and a plurality of mobile stations, each of said mobile stations having means for radiating predetermined first pulse signals, and said beacon station having means for radiating reference pulse signals, apparatus for permitting one mobile station to determine its range from other mobile stations, said apparatus comprising means for synchronizing the first pulse signals of said mobile stations to said reference signals, and means at said one mobile station for indicating the time intervals between its own first pulses and first pulses received from other mobile stations, whereby said ranges are determined as a fraction of said time intervals.

21. In a radio navigation system having a beacon station and a plurality of mobile stations, each of said mobile stations having means for producing and radiating predetermined first pulse signals, and said beacon station having means for radiating reference pulse signals and means for radiating reply pulse signals in fixed time relation to said first pulse signals when received at said beacon station, apparatus for permitting one mobile station to determine its range from other mobile stations, said apparatus comprising means at each of said mobile stations for receiving said reference and reply pulse signals, first means connected to said receiving means and to said first pulse signal producing means for producing a first time signal corresponding to the time interval between its first pulse signal and its received reference signal, second means at each mobile station connected to said receiving means and to said first pulse signal producing means for producing a second time signal corresponding to the time interval between its first pulse signal and its received reply signal, means at each mobile station connected to said first and second means and to said first pulse signal producing means and responsive to said two time signals for maintaining its first pulse signal in synchronism with said reference signal at said beacon station, means at said one mobile station for receiving said first pulse signals radiated by other mobile stations, and means at said one mobile station connected to said first pulse signal producing means and responsive to the time intervals between its own first pulse signals and said received first pulse signals of other mobile stations for indicating the ranges from said one mobile station to others of said mobile stations from which first pulse signals are received.

22. Apparatus for keeping at a desired value the ratio between two time intervals each determined by an initial pulse and a respective final pulse comprising means for producing said initial and final pulses, a pair of capacitors, means connected to said initial pulse producing means and responsive to each said initial pulse for commencing charging of a respective capacitor, means connected to said final pulse producing means and to said capacitors for termianting charging of each of said capacitors by a respective final pulse, and means connected to said capacitors and to said initial pulse producing means and responsive to the voltages of said capacitors for adjusting said intervals toward said desired ratio by adjusting the time of occurrence of said initial pulses.

23. In a navigation system a first station having means for producing and transmitting interrogation pulses, a second station having means for transmitting reference pulses at a fixed frequency, said second station also having means for transmitting reply pulses in response to received interrogation pulses, said first station also having; means for receiving said reference and reply pulses from said second station, first means connected to said receiver and to said means for producing said interrogation pulses for measuring the time between transmission of one interrogation pulse and the receipt of a reference pulse and for producing a first signal representative thereof, second means connected to said receiver and to said means for producing said interrogation pulses for measuring the time between the transmission of said one interrogation pulse and the reception of the reply pulse transmitted in response to it and for producing a second signal representative thereof, means connected to said first and second measuring means for comparing said first and second signals and for producing a third signal representative of the comparison, and means responsive to said third signal connected to said comparing means and said interrogation pulse transmitting means for synchronizing said interrogation pulses to said reference pulses.

24. A radio navigation system comprising means for transmitting a reference signal from a second location to a first location having a variable distance therebetween, means for producing a first signal at said first location, means connected to said first signal producing means for deriving a second signal at said first location corresponding to said first signal delayed by a time interval corresponding to twice the radiant energy propagation time between said two locations, and means at said first location responsive to said derived second signal and to said reference signal for said second location for synchronizing said first signal at said first location to said reference signal at said second location.

25. A system as in claim 24, wherein said last means comprises means for maintaining fixed the ratio of the time interval between said first pulse signal and said reference pulse signal received at said first location to the time interval between said first pulse signal and said derived second signal.

26. A radio navigation system comprising means for producing a first signal at a first location, means for producing a reference signal at a second location having a variable distance from said first location, means for deriving at said first location in response to said first and reference signals a signal representative of said distance between said two locations, and means connected to said means for producing said first signal and responsive to said latter derived signal for adjusting said first signal producing means to maintain said first signal at said first location in synchronism with said reference signal at said second location.

27. A radio navigation system comprising means for producing first signals at a first location, means for producing reference signals at a second location having a variable distance from said first location, means connected to said reference signal producing means for transmitting said reference signals to said first location, means for receiving said reference signals at said first location, means responsive to said first and reference signals for deriving at said first location a signal representative of said distance between said two locations, and means connected to said first signal producing means and responsive to said latter derived signal and to said received reference signal for adjusting said first signal source to maintain said first signal at said first location in synchronism with said reference signal at said second location.

28. In a pulse transmission system the combination comprising first means for producing a first pulse, second means for producing a second pulse, said second means also producing a third pulse in response to said first pulse, and means connected to said first means for synchronizing the production of said first pulse to said second pulse to have a predetermined time relationship therewith, said last-named means being operative in response to second and third pulses.

29. In a pulse transmission system the combination comprising first means for transmitting first pulses, second means for transmitting second and third pulses, and means connected to said first means and operative in response to a said first, second and third pulses for synchronizing the transmission of a said first pulse to a said second pulse to have a predetermined time relationship therewith.

30. A radio navigation system at a first station which transmits first signals for use with a second station which second station transmits second signals and produces a third signal in response to receiving a first signal from said first station comprising: apparatus at said first station for transmitting a said first signal at one of a plurality of predetermined times which occur between two second signals, said apparatus comprising; (a) means for receiving the second signals from said second station and the third signal produced by said second station in response to said transmitted first signal, (b) means responsive to the transmission of a first signal, a received second signal and the third signal produced in response to a transmitted first signal for adjusting the occurrence of said plurality of predetermined times between two second signals at which a first signal can be transmitted so that said plurality of predetermined times have a fixed time relationship with respect to at least one of the two second signals between which they occur, (c) and means for producing a first signal for transmission at one of said predetermined times.

References Cited by the Examiner
UNITED STATES PATENTS

| | | | |
|---|---|---|---|
| 2,612,601 | 9/52 | Musselman | 250—6 |
| 2,869,121 | 1/59 | Minneman et al. | 343—103 |
| 2,884,628 | 4/59 | Loomis | 343—103 |

CHESTER L. JUSTUS, *Primary Examiner.*

UNITED STATES PATENT OFFICE
CERTIFICATE OF CORRECTION

Patent No. 3,183,504                                                       May 11, 1965

Walton Graham

It is hereby certified that error appears in the above numbered patent requiring correction and that the said Letters Patent should read as corrected below.

Column 3, line 75, after "$t_o=0$" insert -- seconds --; column 10, lines 28 and 29, for that portion of equation (8) reading $\frac{\phi}{2\pi}$ read $\frac{\dot{\phi}}{2\pi}$ same column 10, line 31, for "$\phi/2\pi$" read -- $\dot{\phi}/2\pi$ --; column 13, line 20, after "another" insert -- major --; column 15, line 65, for "location" read -- locations --; column 16, line 45, for "relay" read -- reply --; column 18, line 1, after "said", second occurrence, insert -- first --.

(SEAL)     Signed and sealed this 23rd day of November 1965.

Attest:

ERNEST W. SWIDER  
Attesting Officer

EDWARD J. BRENNER  
Commissioner of Patents

UNITED STATES PATENT OFFICE
CERTIFICATE OF CORRECTION

Patent No. 3,183,504                                    May 11, 1965

Walton Graham

It is hereby certified that error appears in the above numbered patent requiring correction and that the said Letters Patent should read as corrected below.

Column 3, line 75, after "$t_o=0$" insert -- seconds --; colum 10, lines 28 and 29, for that portion of equation (8) reading $$\frac{\phi}{2\pi} \quad\quad \text{read} \quad\quad \frac{\dot{\phi}}{2\pi}$$

same column 10, line 31, for "$\phi/2\pi$" read -- $\dot{\phi}/2\pi$ --; column 13, line 20, after "another" insert -- major --; column 15, line 65, for "location" read -- locations --; column 16, line 45, for "relay" read -- reply --; column 18, line 1, after "said", second occurrence, insert -- first --.

(SEAL)     Signed and sealed this 23rd day of November 1965.

Attest:

ERNEST W. SWIDER                                  EDWARD J. BRENNER
Attesting Officer                                       Commissioner of Patents